United States Patent
Custis et al.

(10) Patent No.: US 8,321,425 B2
(45) Date of Patent: Nov. 27, 2012

(54) INFORMATION-RETRIEVAL SYSTEMS, METHODS, AND SOFTWARE WITH CONCEPT-BASED SEARCHING AND RANKING

(75) Inventors: Tonya Custis, Minneapolis, MN (US); Khalid Al-Kofahi, Rosemount, MN (US)

(73) Assignee: Thomson Reuters Global Resources (CH)

( * ) Notice: Subject to any disclaimer, the term of this patent is extended or adjusted under 35 U.S.C. 154(b) by 797 days.

(21) Appl. No.: 12/196,930

(22) Filed: Aug. 22, 2008

(65) Prior Publication Data

US 2009/0198674 A1 Aug. 6, 2009

Related U.S. Application Data

(63) Continuation of application No. 11/965,103, filed on Dec. 27, 2007, now abandoned.

(60) Provisional application No. 60/878,014, filed on Dec. 29, 2006.

(51) Int. Cl.
*G06F 17/30* (2006.01)

(52) U.S. Cl. .................. 707/748; 707/750; 707/770

(58) Field of Classification Search .................. 707/707, 707/723, 748
See application file for complete search history.

(56) References Cited

U.S. PATENT DOCUMENTS

| | | | | |
|---|---|---|---|---|
| 6,684,202 | B1* | 1/2004 | Humphrey et al. | 706/45 |
| 6,917,952 | B1* | 7/2005 | Dailey et al. | 1/1 |
| 6,970,881 | B1 | 11/2005 | Mohan et al. | |
| 7,085,771 | B2* | 8/2006 | Chung et al. | 1/1 |
| 7,152,057 | B2* | 12/2006 | Brill et al. | 1/1 |
| 7,406,459 | B2* | 7/2008 | Chen et al. | 715/205 |
| 7,590,626 | B2* | 9/2009 | Li et al. | 707/708 |
| 7,716,226 | B2* | 5/2010 | Barney | 707/748 |
| 7,765,178 | B1* | 7/2010 | Roizen et al. | 1/1 |
| 7,814,102 | B2* | 10/2010 | Miller | 707/736 |
| 7,865,495 | B1* | 1/2011 | Roizen et al. | 707/708 |
| 2004/0044952 | A1* | 3/2004 | Jiang et al. | 715/500 |
| 2005/0228788 | A1 | 10/2005 | Dahn et al. | |
| 2006/0179051 | A1* | 8/2006 | Whitney et al. | 707/5 |
| 2006/0287988 | A1* | 12/2006 | Mason | 707/3 |
| 2010/0153107 | A1* | 6/2010 | Kawai | 704/240 |

FOREIGN PATENT DOCUMENTS

| | | |
|---|---|---|
| EP | 0597630 A1 | 5/1994 |
| EP | 1288794 A1 | 3/2003 |
| WO | WO-9708604 A2 | 3/1997 |

(Continued)

OTHER PUBLICATIONS

Yutaka Matsuo et al. "Keyword Extraction from a Single document using Word Co-Occurrence Statistical Information", Flairs 2004, pp. 392-396 (5 pages total).*

(Continued)

*Primary Examiner* — Debbie Le
(74) *Attorney, Agent, or Firm* — Valenti Hanley & Robinson, PLLC; Kevin T. Duncan

(57) ABSTRACT

To improve traditional keyword based search engines, the present inventors devised, among other things, systems, methods, and software that use word co-occurrence probabilities not only to identify documents conceptually related to user queries, but also to score and rank search results. One exemplary system combines inverse-document-frequency searching with concept searching based on word co-occurrence probabilities to facilitate finding of documents that would otherwise go unfound using a given query. The exemplary system also allows ranking of search results based both on both keyword matching and concept presence, promoting more efficient organization and review of search results.

20 Claims, 2 Drawing Sheets

FOREIGN PATENT DOCUMENTS

WO  WO-2008083211 A1  7/2008

OTHER PUBLICATIONS

Dagan et al. "Similarity-based models of word occurrence probabilities", Machine Learning 1999, pp. 1-27.*

"International Application Serial No. PCT/US2007/088927, International Search Report mailed May 6, 2008", 6 pgs.

"International Application Serial No. PCT/US2007/088927, Written Opinion mailed May 6, 2008", 6 pgs.

* cited by examiner

INFORMATION-RETRIEVAL SYSTEMS, METHODS, AND SOFTWARE WITH CONCEPT-BASED SEARCHING AND RANKING

RELATED APPLICATIONS

This application is a continuation of U.S. patent application Ser. No. 11/965,103, filed on Dec. 27, 2007, which claims priority to U.S. Provisional Application Ser. No. 60/878,014, filed Dec. 29, 2006, which are incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2006, Thomson Global Resources, an entity organized under the laws of Ireland.

TECHNICAL FIELD

Various embodiments of the present invention concern information-retrieval systems and related query processing components and methods.

BACKGROUND

The growth in popularity of the Internet and other computer networks has fueled not only an increasing availability, but an increasing appetite among computer users for digital information. Users typically seek access to this information using an access device, such a computer, to communicate with an online information-retrieval system. The information-retrieval system typically includes a graphical user interface for entering and submitting requests for information, known as queries, to a remote search engine. The search engine identifies relevant information, typically in the form of electronic documents, and returns a results list to the user's access device.

One problem identified by the present inventors concerns operation of typical search engines, which require queries and documents to contain matching words. This is problematic for at least three reasons. First, search results may include documents that contain the query term but are irrelevant because the user intended a different sense (or meaning) of that query term that term matching fails to distinguish. This ultimately leaves the user to manually filter through irrelevant results in search for the most relevant documents.

Second, reliance on matching query terms to document terms can also result in search results that omit conceptually relevant documents because they do not contain the exact query terms entered by the user. Retrieving these relevant documents using a traditional search engine requires the user to appreciate the variability of word choices for a given concept and construct better queries. Alternatively, users may simply do without these valuable documents.

And third, traditional keyword search engines score and rank the relevance of documents based on the presence of query terms in those documents. This means that some documents with matching query terms and with non-matching but conceptually relevant terms may be ranked lower than desirable given their actual conceptual relevance to a given query. These erroneous lower rankings may force the user to wade through lesser relevant documents on the way to the more relevant documents or to overlook some of these documents completely.

Accordingly, the inventors have identified a need to further improve how information-retrieval systems process user queries.

SUMMARY

To address this and/or other needs, the present inventors devised, among other things, systems, methods, and software that use word co-occurrence probabilities not only to identify documents conceptually related to user queries, but also to score and rank search results. One exemplary system combines inverse-document-frequency searching with concept searching based on word co-occurrence probabilities to facilitate finding of documents that would otherwise go unfound using a given query. The exemplary system also allows ranking of search results based both on both keyword matching and concept presence, promoting more efficient organization and review of search results.

DETAILED DESCRIPTION OF EXEMPLARY EMBODIMENT(S)

Figure 1:
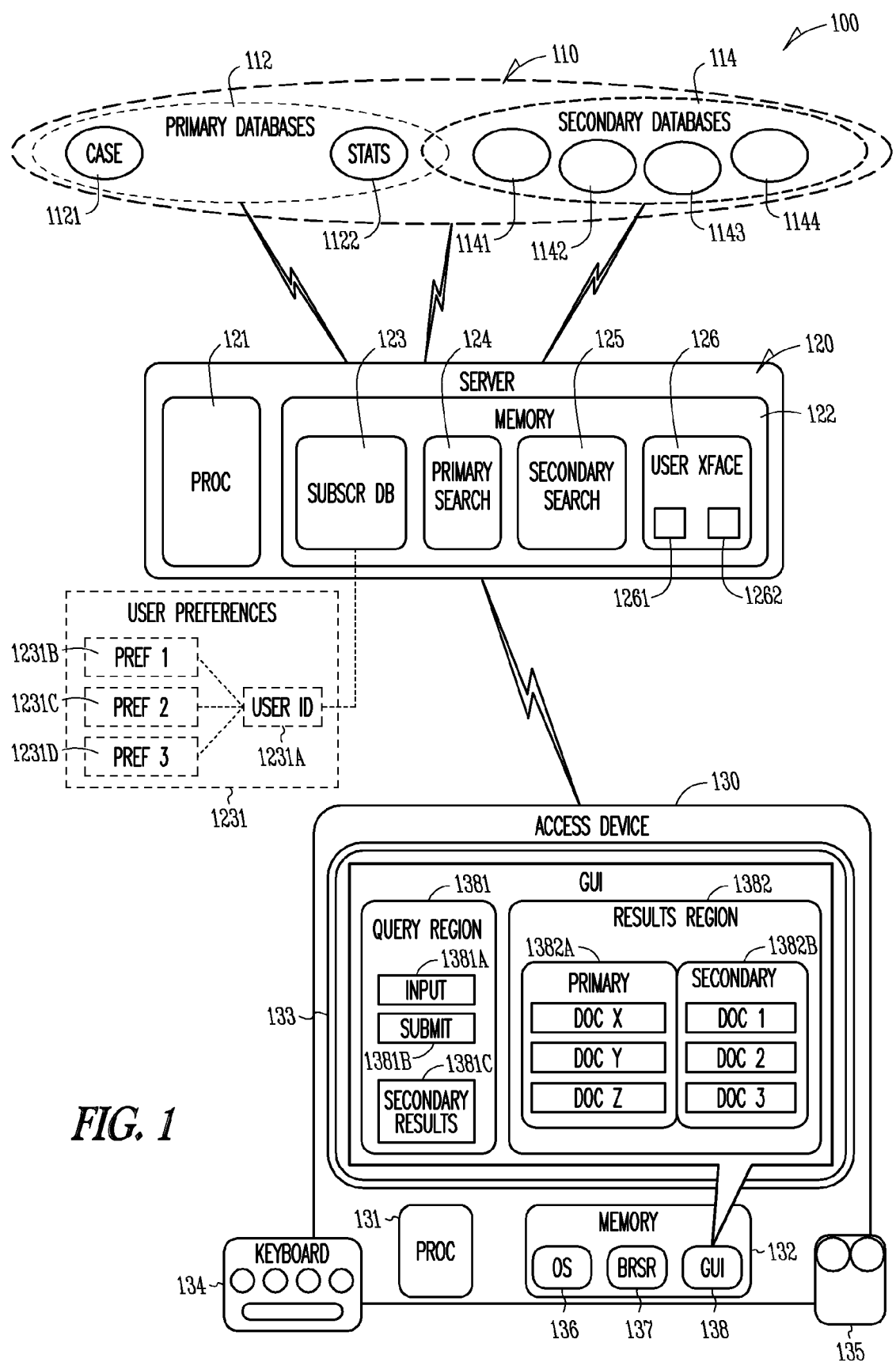
FIG. 1 is a block diagram of an exemplary information-retrieval system 100 which corresponds to one or more embodiments of the present invention.

This document describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Overview

The exemplary system uses "translation" probabilities between pairs of words as a basis for identifying documents conceptually relevant to user queries. A "translation" probability is the probability that one word can be translated into another. This is easy to grasp when translating from one language to another—for example, there is a high probability that pomme in French will be translated into English as apple; whereas there is a near-zero probability that pomme will be translated as sock.

In the exemplary embodiment, the "translation" probabilities are monolingual, and can capture synonymy and other semantic relationships between words. The more two words are related in their meanings, the higher their translation probability. For example, lawyer and attorney are interchangeable synonyms, so their translation probability is high. As another example, consider the correlation between words such as football, NFL, quarterback, coach, etc. These are not synonyms, but they are semantically related and, therefore, have some measurable translation probability.

In the exemplary embodiment, the translation probabilities are derived from word co-occurrence data. Information about pairs of co-occurring words is used to statistically capture semantic (conceptual) relationships. In the exemplary implementation, the "concept" representing a particular word (word X) is treated as being equivalent to all the words that co-occur with word X in the co-occurrence data. When more words paired with word X appear in a document, more evidence is given to the notion that the concept of word X is discussed in the document. Such evidence, in turn, leads to a higher document score when word X is a query term (regardless of whether word X appears in the document).

Using translation probabilities derived from co-occurrence data allows the retrieval algorithm to return documents containing words that are semantically related (e.g., high translation probabilities) to the user's query terms. Because of this, actual query words are not required to be present in a document for the document to be returned as a relevant result. For example, in a search for lawyer, a document that does not contain the word lawyer but contains attorney, trial, fees, and/or judge could be retrieved as a relevant document.

In another example, the query "hot coffee" in a keyword based search fails to find the following document, which includes the term "hot," but omits the term "coffee." However, the exemplary embodiment broadly conceptualizes this query to effectively encompass all words that statistically co-occur within a window around the individual query terms. This allows retrieval of the document, based on the presence of other terms shown that are statistically related to "hot" (underlined), "coffee" (bold), or both "coffee" and "hot" (bold and underlined). The query term "hot" is shown with double underlining.

> Plaintiff sought damages for mental anguish alleging she now has anxiety attacks when she sees people drinking hot drinks. Plaintiff claimed total medical of $1,785 and $14,000 in lost wages as a beautician who gives facials. Defendant presented as evidence, a surveillance tape which showed Plaintiff drinking hot drinks.
> INJURIES: Plaintiff went through the drive-thru of McDonald's for two hot teas. Plaintiff alleged that as Paula Edwards handed her the tray with the), or both "hot" and "coffee" (green or bold and underlined):
> Plaintiff suffered a second degree burn to her left arm which left some two hot teas, she dropped the tray and spilled the hot tea on Ms. Allami's arm. Plaintiff alleged negligent hiring and training as to McDonald's Restaurant, although no evidence was presented at trial. Defendant contended the Plaintiff spilled the hot tea on herself.

Rather than deriving concepts from co-occurrence data, one might consider having a domain expert construct concepts by hand. Constructing concepts by hand is a difficult, time-consuming, and subjective process. In addition, concepts that are hand-tailored for one domain may not carry over to another. By capturing concepts statistically through co-occurrence, the domain can be captured automatically, taking subjectivity out of the process.

Applications of this novel form of concept search are numerous. In the legal domain, concept search is a useful tool in e-discovery, where finding all of the documents relevant to a case is important. In general, concept search will be useful in cases where the user may not be an expert in the area in which she is searching, as well as in cases where the user does not know a technical or specific term for something.

Exemplary Information-Retrieval System

FIG. 1 shows an exemplary online information-retrieval system 100. System 100 includes one or more databases 110, one or more servers 120, and one or more access devices 130.

Exemplary Databases

Databases 110 includes a set of one or more databases. Exemplary legal databases include a case law database and a statutes database, which respectively include judicial opinions and statutes from one or more local, state, federal, and/or international jurisdictions. Exemplary legal databases also include legal classification databases and law reviews. Other exemplary databases provide attorney, judge, law firm, product, and corporate profiles. In some embodiments, the case law documents are logically associated via a data structure with documents or profiles in other databases. Other embodiments may include non-legal databases that include financial, scientific, or health-care information. Still other embodiments provide public or private databases, such as those made available through INFOTRAC. Some embodiments allow Internet searching, and thus encompass web sites and web pages and others allow users to define their own databases, for example a database of documents, such as email documents, pursuant to electronic discovery.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Exemplary Server

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a primary search module 124, a concept search module 125, and a user-interface module 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, primary search module 124, concept search module 125, and user-interface module 126.

Subscriber database 123 includes subscriber-related data for controlling, administering, and managing pay-as-you-go or subscription-based access of databases 110. In the exemplary embodiment, subscriber database 123 includes one or more preference data structures, of which data structure 1231 is representative. Data structure 1221 includes a customer or user identifier portion 1231A, which is logically associated with one or more concept searching or presentation preferences, such as preferences 1231B, 1231C, and 1231D. Preference 1231B includes a default value governing whether concept searching is enabled or disabled. Preference 1231C includes a default value governing presentation of search results, such as whether documents that would not have been retrieved but for the concept searching are flagged or presented in a separate tab or folder. Preference 1231D includes a default value governing whether or not or how much concept searching is allowed to affect the relevancy calculation for search results. (In the absence of a temporary user override, for example, an override during a particular query or session, the default values for concept searching govern.)

Primary search module 124 includes one or more search engines and related user-interface components, for receiving and processing user queries against one or more of databases 110. In the exemplary embodiment, one or more search engines associated with search module 124 provide Boolean, tf-idf, natural-language search capabilities.

Concept search module 125 includes one or more concept search engines for receiving and processing queries using concept searching techniques described herein against one or more of databases 110. Some embodiments charge a separate or additional fee for searching and/or accessing documents via concept searching. In particular, concept search module 125 include concept searching data 1251 and concept searching engine 1252.

Concept searching data 1251 includes one more sets of statistical data regarding pairs of co-occurring words in documents to implicitly capture semantic (conceptual) relationships. The statistics about the co-occurrence pairs are used directly in the exemplary information retrieval algorithm, obviating any need in the exemplary embodiment to combine pre-existing, stand-alone concepts with existing search mechanisms.

More particularly, concept searching data 1251 includes co-occurrence probabilities 1251A for pairs of words from a corpus ("universe") of documents and an index 1251A of co-occurrence probabilities for the targeted document collection (databases 110).

Co-occurrence probabilities 1251A, in the exemplary embodiment, are determined from a separate source than the targeted document collection to promote a concept stability that is not dependent on the target document collection. For example, in the legal domain, this universe includes 20 million headnote documents. Although the headnotes are manually defined for case law documents by human editors in the exemplary embodiment, some embodiments may use machine documents summaries, encyclopedic references, and so forth. For an exemplary news domain, the separate universe or corpus encompasses 900,000 documents. (In general, it is presently believed that the corpus used as a basis for the co-occurrence data should be larger in terms of documents than the targeted database. However, speculation is that a smaller more informationally dense set of documents, for example based on rare-word density, may also be useful.)

Word pairs are constructed from the corpus in the following manner: stop words are removed, and then each word is paired with all other words (including itself) up to a distance of 5 words on either side of it, yielding 11 word pairs per word. Word pairs are unordered (i.e., X_Y=Y_X) in the exemplary embodiment. (However, some embodiments may use ordered word pairs.) In addition, the exemplary embodiment truncates words in the word pairs at eight characters, providing a certain amount of smoothing to the word pairs data.

Each word pair is associated with one or more frequency counts. Since each word is also paired with itself, counts are also kept for single terms. Using these frequency counts for the word pairs in the corpus, the exemplary embodiment determines co-occurrence probabilities. Specifically, this entails computing the following maximum likelihood estimate (MLE):

$$P_{mle}(w1|w2) = \text{frequency of the word pair } w1\_w2 / \text{frequency of } w2\_w2 \quad \text{Eq. (1)}$$

These are the (unsmoothed) probability estimates that are used in the concept search component of the language models, showing up as $P(q|d)$ in the equations. These probabilities allow us to quantify the degree to which q and d are likely to co-occur. Summed over all the $d \in D$, all the co-occurrences between terms in a particular document and q provide evidence for the concept of q in that document, as represented by q and all the words with which it enters into co-occurrence relations. Although related terms (i.e., word pairs) are not always words that an expert would pick in defining a concept by hand, the word pairs (more generally word n-grams) capture the "concept" implicitly through statistical co-occurrence.

Index 1251B is based on the co-occurrence probabilities determined for the corpus. The targeted document collection, for example one or more portions of databases 110, is indexed in terms of $P(w|D)$ probabilities. To combat sparseness, these probabilities are smoothed against the entire collection using Jelinek-Mercer smoothing, which is governed by $$P(w|D) = \lambda P_{mle}(w|\text{Document}) + (1-\lambda) P_{mle}(w|\text{Collection}) \quad \text{Eq. (2)}$$

The value of lambda $\lambda$ for smoothing is set empirically for each collection and is influenced by factors such as the length of the documents in the collection and the size of the collection.

Concept search engine 1252 identifies documents from databases 110 based on conceptual relationship with user query terms. In the exemplary embodiment, this entails combining keyword search with co-occurrence probabilities in the concept search data 1241 and uses language-modeling techniques for information retrieval and from statistical machine translation. In a keyword-based language modeling approach to information retrieval, each document is scored based on the probability (P) that a query word (q) appears in that document (D): $P(q|D) \approx$ number of times q occurs in D divided by length of D. In this keyword model, documents are scored according to the following equation:

$$\text{Document Score} = P(q_1|D) \times P(q_2|D) \times \ldots \times P(q_n|D) \quad \text{Eq. (3)}$$
$$= \Pi_i P(q_i|D) \text{ for all } q \text{ in } Q$$

where Q denotes the entire query. The search results are typically returned to the user in the order of highest score first. On the other hand, in language modeling techniques of statistical machine translation, scoring is based on a "translation" probability, $P(q|d)$: or the probability that a word in a document could be interpreted as the query word. However, instead of literally "translating" the word in a document, the exemplary embodiment uses the word-pair co-occurrence probabilities as a measure of conceptual closeness to translate with a wider target.

Combining these two approaches into a novel hybrid model, the exemplary embodiment scores documents according to $$\text{Document Score} = \Pi_i [\lambda_1 P(q_i|D) + \lambda_2 \Sigma_k P(q_i|d_k) P(d_k|D)] \quad \text{Eq. (4)}$$

where $P(Q|D) = \Pi_i P(q_1|D)$ represents the keyword-based language model for information retrieval:

$$P(Q|D) = \Pi_i \Sigma_k P(q_i|d_k) P(d_k|D) \quad \text{Eq. (5)}$$

represents Berger & Lafferty's (1999) translation language model; and $\lambda_1$ and $\lambda_2$ denote weighting factors on the two search components. The exemplary embodiment weights the keyword and concept search components equally at 0.5.

However, by changing the values of $\lambda_1$ and $\lambda_2$ (under the constraint that $\lambda_1+\lambda_2=1$), either component can be given greater weight.

In sum, the exemplary concept search combines keyword searching with co-occurrence probabilities, allowing for the retrieval of documents that are both keyword- and conceptually-relevant to the user's query. In this approach, one can appreciate:

That use of co-occurrence pairs boost recall, allowing more relevant documents to be retrieved in relation to all relevant documents;

That use of keyword-based language modeling has high precision; and

That the model is flexible because it allows "weighting" its components differently to maximize recall and precision.

Some embodiments leverage query dependencies, recognizing that a query itself represents the concept that a user is searching for. In particular, one embodiment of this approach models the dependencies between query words using word pairs, thereby capturing conceptual information. Therefore, instead of breaking the query into single query terms, the exemplary embodiment represents the query as all possible word pairs contained in it. For example, the query "big red balloon" yields the following query word pairs: big_big, red_red, balloon_balloon, big_red, big_balloon, red_balloon For word pairs, the document score is defined as $$\text{Document Score}=\Pi[\lambda_1 P(q1\_q2|D)+\lambda_2 \Sigma[[P(q1|d)+P(q2|d)]P(d|D)]] \qquad \text{Eq. (6)}$$

where $P(q1|d)+P(q2|d)$ is only evaluated in the case that both $P(q1|d)$ and $P(q2|d)$ are not zero. Because the exemplary embodiment lacks the probabilities for a biterm pair given a document term, $P(w1\_w2|d)$, it approximates these on the fly by making the concept search portion of the scoring equation dependent on the co-occurrence probabilities of both words in the biterm with respect to the document terms. For the query word biterm q1_q2, the exemplary embodiment adds the co-occurrence probabilities $P(q1|d)$ and $P(q2|d)$ together, and then multiplies by $P(d|D)$ for each document term for which $P(q1|d)$ and $P(q2|d)$ both exist. In the event that either $P(q1|d)$ or $P(q2|d)$ does not exist, $P(q1|d)+P(q2|d)$ is set equal to zero. As with the unigram concept-search language model, both $\lambda 1$ and $\lambda 2$ are set to 0.5, thereby weighting the keyword and concept-search components equally.

Some embodiments use modified version of Eqs. (4) or (6) which replace or supplement the concept component with another type of relevancy indicator. For example, one such embodiment adds in a relevancy factor based on usage statistics for the document. Such statistics may be based on print, email, or click-through frequency for the document for similar queries; user survey or ratings date for the document; and/or citation statistics for the document. These factors may be weighted by a lambda factor under the constraint that the sum of the lambda factors is one.

User-interface module 126 includes machine readable and/or executable instruction sets for wholly or partly defining web-based user interfaces, such as search interface 1261 and results interface 1262, over a wireless or wireline communications network on one or more accesses devices, such as access device 130.

Exemplary Access Device

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131 one or more processors (or processing circuits) 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120 to implement the interfaces shown above or described elsewhere in this description.)

In the exemplary embodiment, each of these control features takes the form of a hyperlink or other browser-compatible command input, and provides access to and control of a query region 1381 and a search-results region 1382. User selection of the control features in region 1382, specifically input of a textual query into input field 1381A and submission of the query to server 120 via actuation of submit button 1381B, results in presentation of search results list 1382A in results region 1382. Selection of a listed document from list 1382A results in retrieval of and display of at least a portion of the corresponding document within a region of interface 138 (not shown in this figure.) Although FIG. 1 shows region 1381 and 1382 as being simultaneously displayed, some embodiments present them at separate times. Other functional aspects of the interface are described below.

Exemplary Method(s) of Operation

Figure 2:
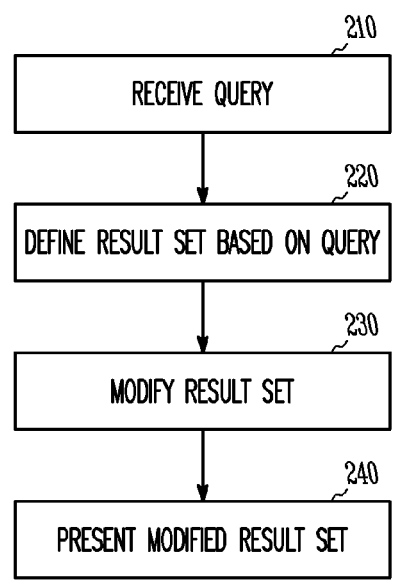
FIG. 2 is a flow chart of an exemplary method of operating system 100, which corresponds to one or more embodiments of the present invention.

FIG. 2 shows a flow chart 200 of one or more exemplary methods of operating a system, such as system 100. Flow chart 200 includes blocks 210-240, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

In block 210 the method begins with receiving a query from a user. In the exemplary embodiment, this entails a user using a browser capability in access device 130 to access online information-retrieval system 100, specifically server 120 using a conventional login process. Once logged in, a user interface, such as interface 138 is rendered, enabling the user to define and submit a query to server 120. Execution proceeds to block 220.

Block 220 entails defining a ranked result set of one or more documents from a document set using the received query in a conventional keyword or natural language search engine. In the exemplary embodiment, this entails searching databases 110, for example legal, scientific, or patent databases, using a tf-idf-type search engine to identify and rank a set of documents based on relevance to the received query. Execution then proceeds to block 230.

Block 230 entails modifying the result set based on conceptual or semantic relationships with the received query. In a first embodiment, this entails identifying a set of documents based exclusively on conceptual relationship with all or one or more portions of the received query. This entails parsing the query into a set of all possible n-grams, for example one-grams or bigrams (biterms) and using these n-grams to identify a set of documents that have a sufficiently high probability of including terms that co-occur with the terms in the query. In this embodiment, each term in the biterm is truncated to eight characters. These identified documents are then combined with the ranked result set to define a modified result set. The modified result set is then scored and reranked according to Eq. (4) or Eq. (6) depending on whether single query terms or query biterms are used.

In a second embodiment, no further searching based on conceptual or semantic relationships is done and the result set is simply scored and reranked according to Eq. (4) or Eq. (6). Some embodiments may simply receive queries and results sets from third-parties and rerank them using Eqs. (2) and/or (5). Execution then proceeds to block 240.

In block 240, the modified search results are presented to the user. In the exemplary embodiment, this entails defining and rendering a list of hyperlinks on a display associated with a user, for example the display for access device 130 in system 100. In some embodiments, documents that are identified on the concept searching alone, that is documents lacking any of the query terms are flagged via a font difference and/or adjacent symbol to highlight the value of the concept searching in improving recall of relevant documents. Other embodiments may also provide flagging for documents that include both matching key words and concept, or indicate relevance to as a means to promote improved recall. Still other embodiments may present the list with a control feature that allows one to segregate documents found on the basis of matching keywords from those found only on the basis of keyword searching, for example by providing separate folders or tabs. Another embodiment allows user to selectively invoke a control feature that cordons off or flags potentially irrelevant documents, i.e, documents that have a low probability of being conceptually relevant to the query even though they literally satisfy the terms of the query. These documents are identified on the basis of lacking terms that statistically co-occur with the query terms at a sufficiently high probability.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the issued claims and their equivalents.

What is claimed is:

1. A system having a processor and a memory and further comprising:
    a set of target documents; and
    means for searching and identifying by the processor one or more of the set of target documents as result documents based on identifying a set of at least one concept associated with a user query, that means for searching and identifying including: means for identifying by the processor a first set of documents based at least in part on a set of word co-occurrence probabilities and means for ranking the first set of documents based at least in part on the set of word co-occurrence probabilities, with the set of word co-occurrence probabilities derived from at least one corpus of documents related to the set of at least one concept.

2. The system of claim 1, wherein the means for ranking the first set of documents is further based on importance of the set of at least one concept to each of the first set of documents.

3. The system of claim 1, wherein the set of target documents includes case law documents.

4. The system of claim 1, wherein the set of target documents includes corporate electronic mail or news documents.

5. The system of claim 1, wherein the corpus of documents includes the set of target documents.

6. The system of claim 1, wherein the set of word co-occurrence probabilities is based on content associated with the set of target documents.

7. The system of claim 2, wherein concept importance to each of the result documents is based on contribution of terms contained in each of the result documents to the concept.

8. The system of claim 7, wherein the contribution of the terms to the concept is based on word co-occurrence probabilities extracted from the at least one corpus of documents.

9. The system of claim 1, wherein the at least one corpus of documents is predetermined to relate to the set of at least one concept to create a concept-based corpus of documents.

10. A method for using a query having one or more query terms to identify a set of one or more documents within a database, the method comprising:
    identifying a set of at least one concept associated with one or more query terms comprising a query;
    determining for each of one or more documents in the database a score based on:
        occurrence of one or more of the query terms in the document; and
        occurrence of one or more non-query terms that are in the document, the non-query terms being known to co-occur with one or more of the query terms in a set of documents and being associated with the set of at least one concept;
    ranking, respectively, one or more of the documents within a search result based on its determined score; and
    displaying the one or more of the documents based on the ranking.

11. The method of claim 10, wherein the score is based at least in part on a keyword model and a translation language model.

12. The method of claim 10, wherein the score is based on a sum of a first quantity and a second quantity, the first quantity based at least in part on a count of how many times one of the query terms occurs in the document, and the second quantity based at least in part on a count of how many times one of the non-query terms co-occurs with one of the query terms in the set of documents.

13. The method of claim 10, further comprising determining a set of probabilities based on the set of one or more documents within the database.

14. The method of claim 10, wherein determining for each of one or more documents in the database a score is further based on a relative contribution of the query terms and non-query terms to the at least one concept.

15. The method of claim 10, wherein the set of documents is predetermined to relate to the set of at least one concept and represents a concept-based corpus of documents.

16. The method of claim 15, further comprising adding one or more of the set of documents found to be sufficiently relevant to a first concept to the concept-based corpus of documents related to the first concept.

17. A search method configured to be executed by a computer having a processor and comprising:
  searching and identifying by the processor one or more of a set of target documents as result documents based on identifying a set of at least one concept associated with a user query, identifying by the processor a first set of documents based at least in part on a set of word co-occurrence probabilities and ranking the first set of documents based at least in part on the set of word co-occurrence probabilities, with the set of word co-occurrence probabilities derived from a corpus of documents related to the set of at least one concept.

18. The search method of claim 17, wherein corpus of documents includes the set of target documents.

19. A system for using a query having one or more query terms to identify a set of one or more documents within a database, the system having a processor and a memory and further comprising a code set adapted to:
  identify a set of at least one concept associated with one or more query terms comprising a query;
  determine for each of one or more documents in the database a score based on:
    occurrence of one or more of the query terms in the document; and
    occurrence of one or more non-query terms in the document, the non-query terms being known to co-occur with one or more of the query terms in a set of documents and being associated with the set of at least one concept;
  rank, respectively, one or more of the documents within a search result based on its determined score; and
  display the one or more of the documents based on its rank.

20. The system of claim 19, further comprising a set of probabilities based on the set of one or more documents within the database.

* * * * *